United States Patent
Duyvesteyn

(10) Patent No.: US 6,340,423 B1
(45) Date of Patent: Jan. 22, 2002

(54) HYDROMETALLURGICAL PROCESSING OF LEAD MATERIALS USING FLUOTITANATE

(75) Inventor: Willem P. C. Duyvesteyn, Reno, NV (US)

(73) Assignee: BHP Minerals International, Inc., Houston, TX (US)

( * ) Notice: Subject to any disclaimer, the term of this patent is extended or adjusted under 35 U.S.C. 154(b) by 0 days.

(21) Appl. No.: 09/523,082

(22) Filed: Mar. 10, 2000

Related U.S. Application Data

(60) Provisional application No. 60/128,997, filed on Apr. 12, 1999.

(51) Int. Cl.⁷ ............................................. C25C 1/18
(52) U.S. Cl. ...................................... 205/600; 205/599
(58) Field of Search ................................ 204/233, 234, 204/235, 236; 205/599, 600

(56) References Cited

U.S. PATENT DOCUMENTS

| | | |
|---|---|---|
| 679,824 A | 8/1901 | Betts |
| 713,277 A | 11/1902 | Betts |
| 2,837,426 A | 6/1958 | Kamlet |
| 4,124,461 A | 11/1978 | Stauter |
| 4,135,997 A | 1/1979 | Stauter |
| 4,149,947 A | 4/1979 | Stauter et al. |
| 4,177,117 A | 12/1979 | Kerby |
| 4,359,449 A | 11/1982 | Hard et al. |
| 4,390,365 A | 6/1983 | Hard et al. |
| 4,416,746 A | 11/1983 | Kerby et al. |
| 4,500,398 A * | 2/1985 | Cole, Jr. et al. ............ 205/599 |
| 4,769,116 A | 9/1988 | Olper et al. |
| 4,780,302 A | 10/1988 | Spijker |
| 4,927,510 A | 5/1990 | Olper et al. |
| 5,030,520 A | 7/1991 | Olper et al. |
| 5,039,337 A | 8/1991 | Olper et al. |
| 5,106,466 A | 4/1992 | Olper et al. |
| 5,277,777 A | 1/1994 | Olper et al. |
| 5,441,609 A | 8/1995 | Olper |
| 5,762,683 A | 6/1998 | Jackson et al. |

FOREIGN PATENT DOCUMENTS

| | | |
|---|---|---|
| EP | 0508960 | 10/1992 |
| RU | 840175 | 6/1981 |

* cited by examiner

*Primary Examiner*—Kathryn Gorgos
*Assistant Examiner*—Wesley A. Nicolas
(74) *Attorney, Agent, or Firm*—Brinks Hofer Gilson & Lione; G. Peter Nichols

(57) ABSTRACT

Raw lead to be refined is leached in a leach apparatus with a leach solution containing fluoro compounds. During the leaching step, lead is dissolved, with ferric fluro compounds being reduced to ferrous fluro compounds. The leaching solution resulting from the leaching step is sent to the cathodic compartment of a diaphragm cell in which lead is deposited on a cathode, in compact, highly pure form. The solution that is depleted of lead is sent to the anodic compartment in which a suitable anode oxidizes the ferrous fluro compound to ferric fluro compounds that can be recycled to the leaching step.

22 Claims, 1 Drawing Sheet

HYDROMETALLURGICAL PROCESSING OF LEAD MATERIALS USING FLUOTITANATE

The present application claims priority to U.S. Ser. No. 60/128,997 filed Apr. 12, 1999, the entire contents of which is incorporated herein by reference.

The present invention relates to a method for hydrometallurgically processing lead materials. In particular, it relates to the use of fluoro compounds to leach the lead materials so they can be further processed. More particularly, it relates to fluorotitanate compounds and their use in hydrometallurgically processing lead materials.

BACKGROUND OF THE INVENTION

It is known to produce lead metal from galena by smelting. The problem with this method is that it creates a considerable amount of lead (and other metal) dust and sulfur dioxide gas, which presents a substantial environmental problem.

In response to this and other problems, hydrometallurgical processes have been proposed. In one process, the galena is leached in an aqueous solution of ferric chloride with sodium chloride. The sulfur-containing residue is filtered and the lead chloride is electrolyzed as a fused salt. The problem with this method is that is complex, not environmentally safe, consumes a large amount of energy and does not produce lead of sufficiently high purity.

In another process, described in U.S. Pat. No. 5,039,337, the galena is leached with an acidic aqueous solution of ferric fluoborate to form ferrous fluoborate, lead fluoborate and elemental sulfur. The solution of ferrous fluoborate and lead fluoborate is sent to a diaphragm electrolytic cell, where pure lead is deposited at the cathode and the ferrous ion is oxidized to ferric ion at the anode. As a result, the ferric fluoborate is regenerated so that it can be reused for leaching the galena.

In a similar process, described in U.S. Pat. No. 5,441,609, the source of lead is leached with ferric fluoborate in fluoroboric acid to cause the lead to be dissolved in solution. The solution containing the lead is fed to an electrolytic cell having a diaphragm so that the lead is deposited in pure form at the cathode and the ferrous ions are oxidized to ferric ions at the anode to generate a solution of ferric fluoborate. The ferric fluoborate can then be recycled to leach more lead.

While these two processes produce lead of sufficient quality, one particularly important disadvantage is that fluoroboric acid is very expensive and the solution recycle is cumbersome. For example, most environmental regulations require, for solution disposal purposes, that boron be less than 1 ppm. Unfortunately, the boron present in an aqueous solution as a borate compound is extremely stable and highly soluble over a wide range of pH. Thus, when fluoborate is used, a complex waste solution recycle and disposal scheme must be in place. Because of the complexity of the recycle system and the cost of fluoroboric acid (boron) as well as the cost of the necessary recycle equipment, there is a need for a process to economically and effectively produce suitable high purity lead.

The process according to the present invention solves that need by using a leachate, fluotitanate, that is less expensive than the fluoborate. Using current day commodity prices, the cost of one volume of fluotitanate leach solution is less than 40% the corresponding cost for the fluoborate system.

SUMMARY OF THE INVENTION

The present invention provides a process for hydrometallurgical processing of lead. In general, the process is directed to the use of fluotitanate in the processing of lead.

In one embodiment, the process comprises the following steps. Leaching a source of lead with a leach solution containing fluoro compounds to dissolve the lead and to form a leachate solution containing ferrous fluro compounds, lead fluro compounds and elemental sulfur. In particular, the leach solution is an aqueous solution containing one or more fluoro compounds selected from the group consisting of fluosilicate, fluotitanate, fluoborate, and mixtures thereof. Preferably, when fluoborate is used as an ingredient of the leach solution, it is used in combination with other fluoro compounds such as fluosilicate and fluotitanate in order to reduce the cost of the leach solution. In this regard, fluoborate is generally used in amounts no greater than 50% by weight of the leach solution. In a preferred embodiment, the leach solution contains a major amount of ferric fluotitanate. In this preferred embodiment, the lead-containing material is leached to form a solution containing ferrous fluotitanate, lead fluotitanate, and elemental sulfur.

The resulting leachate solution is preferably filtered to remove any residue and to form a lead-enriched solution.

Thereafter, according to one embodiment, the lead-enriched solution is fed to an electrolytic cell having a diaphragm, in which lead is deposited in pure form at the cathode and ferrous ions are oxidized to ferric ions at the anode. Preferably, the resulting ferric compounds are recycled to form at least a portion of the leach solution.

According to another embodiment of the invention, the lead-enriched solution is passed into an electrowinning cell wherein the solution is subjected to an electrowinning reaction. The electrowinning of the lead fluoro compounds will result in the production of metallic lead in the form of sheets on the cathodes. The ferric compounds formed during the electrolysis reaction may then be recycled to form at least a portion of the leach solution.

According to yet another embodiment of the present invention, fluotitanate is used as the electrolyte in the electrorefining of lead. In this embodiment, impure lead is placed as an anode or anodes in an electrolyzing solution containing fluotitanate and lead is deposited on the cathode or cathodes. In general, the electrorefining can be accomplished according to the Betts process, details of which are disclosed in U.S. Pat. Nos. 679,824, 713,277 and 713,278, the relevant portions of which are incorporated herein by reference. Alternatively, it is believed that the electrorefining can be accomplished using the bipolar process described in U.S. Pat. No. 4,177,117 and 4,416,746, the relevant portions of which are incorporated herein by reference.

DETAILED DESCRIPTION OF THE INVENTION

Figure 1:
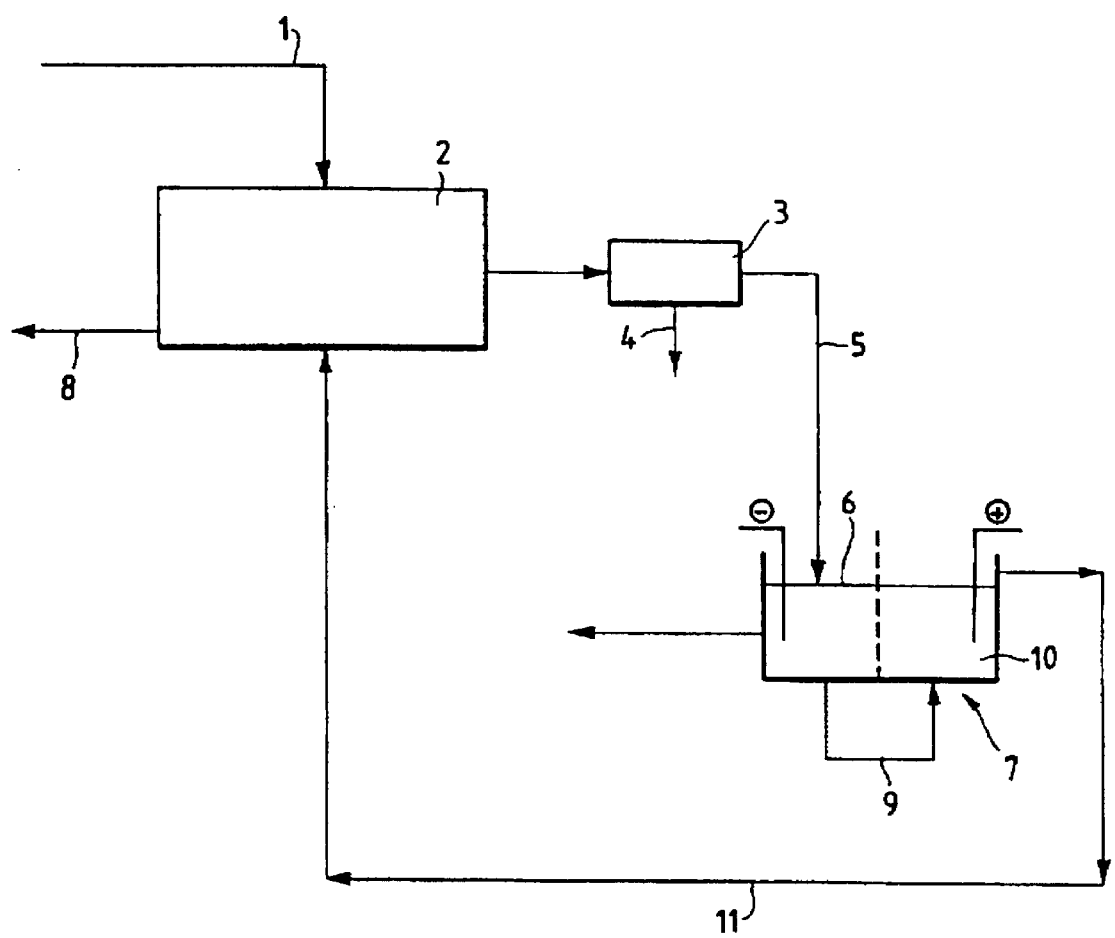
FIG. 1 shows a schematic of one embodiment of the process according to one embodiment of the present invention.

As noted above, the present process generally relates to the use of fluotitanate in the processing of lead. The processing may include leaching, electrorefining, and other processes that may be contemplated for processing lead.

Referring now to FIG. 1, a schematic for one embodiment of the process according to the present invention is shown. In this embodiment, a source of lead 1 is charged to a leaching apparatus 2 inside of which a leaching solution is circulated. Sludge 8 may be removed from the leach apparatus as appropriate or necessary. The leaching solution dissolves the lead to form a leachate solution containing ferrous fluro compounds, lead fluro compounds and elemental sulfur.

The leach solution is generally an aqueous solution containing one or more fluoro compounds selected from the group consisting of fluosilicate, fluotitanate, fluoborate, and mixtures thereof. Preferably, when fluoborate is used as an ingredient of the leach solution, it is used in combination with other fluoro compounds such as fluosilicate and fluotitanate in order to reduce the cost of the leach solution. In this regard, fluotitanate should comprise at least about 20% by weight of the leach solution. The fluosilicate and/or fluoborate is generally used in amounts no greater than 50% by weight of the leach solution. In a preferred embodiment, the leach solution contains a major amount of ferric fluotitanate. In this preferred embodiment, the lead-containing material is leached to form a solution containing ferrous fluotitanate, lead fluotitanate, and elemental sulfur. The leach solution preferably includes fluotitanic acid ($H_2TiF_6$) to increase the acidity of the solution.

Where, for example, the lead is in the form of galena and the leach solution contains ferric fluotitanate, the reaction proceeds according to the following reaction:

$Fe_2(TiF_6)_3 + PbS \rightarrow PbTiF_6 + S° + 2FeTiF_6$

The leaching solution may also include a leveling agent such as glue, calcium and magnesium sulfonate, aloes, and the like. It is understood that other addition agents may be used to obtain the desired effects. The acidity of the leach solution is in the range of about 50 g/l to about 150 g/l. The temperature is within the range of about 30° C. to about 100° C. The reaction time is within the range of 0.5 hours to about 4 hours, according to the type and content of the lead source.

The source of lead may be from any suitable source that contains an appreciable amount of lead to be recovered. For example, the source of lead may be galena, lead fixtures, lead scraps, spent acid battery, lead bullion, etc.

The source of lead may be provided with any suitable particle size keeping in mind that a smaller particle size provides a larger surface area, which may aid in dissolution of the lead in the leachate. The lead may therefore be in the form of small particles of scraps, fragments or bead form and have a particle size of about 50 mm or smaller.

Methods of making fluotitanates, including alkali metal fluotitanates, are described in U.S. Pat. Nos. 4,359,449; 4,390,365; and 4,780,302, the entire contents of each are incorporated herein by reference.

Desirably, the leachate solution containing the ferrous fluoro compounds (e.g., fluotitanate), lead fluoro compounds (e.g., lead fluotitanate) and elemental sulfur is filtered 3 to separate the insoluble portions 4 from the lead-enriched solution 5.

In one embodiment (shown in FIG. 1), the lead-enriched solution 5 is fed to the cathodic compartment 6 of an electrolytic cell 7 where it is deposited. The parent cathodes may be constructed in any suitable manner known to those of skill in the art. For example, they may be stainless steel sheets with perimetrical polyvinyl chloride (PVC) edge bands.

The solution 9 leaving the cathodic compartment 6 of the cell 7 is sent to the anodic compartment 10 of the same cell, where the anode oxidizes ferrous fluoborate to ferric fluoborate, which is then preferably recycled through 11 to the leaching apparatus.

In another embodiment, the lead enriched solution is passed into an electrowinning cell that comprises a conventional or electrolysis or electrorefining cell where the solution is subjected to an electrowinning reaction. The electrowinning is effected under electrolysis conditions in which the parameters that are used will include voltages in the range of from about 1.5 to about 4.0 volts and current densities in the range of from about 100 to about 1000 amps/m². The resulting metallic lead is formed on the cathode as dense and coherent sheets. The solution is also regenerated (e.g., the ferrous fluotitanate is converted to ferric fluotitanate) and can be recycled to form all or a part of the leach solution.

In another embodiment of the present invention, fluotitanate is used in the electrorefining of lead. In this embodiment, the process comprises providing an electrolyte containing a fluotitanate compound in an electrolytic cell; providing an anode comprising a lead source in the electrolytic cell; providing a cathode in the electrolytic cell wherein the anode and cathode are connected to a direct electrical current source; and allowing electrolysis to proceed to deposit refined lead on the cathode.

The lead source may be lead bullion. Preferably, the electrolyte comprises lead fluotitanate and more preferably comprises lead fluotitanate and fluotitanic acid.

The construction of the electrolytic cell, anodes, and cathodes are well known to those of skill in the art. In addition, the determination of the appropriate current density will also be known to those of skill in the art.

The following examples illustrate, but do not limit, the present invention. Unless otherwise indicated, all parts and percentages are by weight.

EXAMPLE 1

A solution of fluotitanate ($H_2TiF_6$) was prepared by adding 77 grams of $TiOCl.3H_2O$ in 90 ml of HF, which was diluted with water to 100 ml. The solution was boiled for 30 minutes to eliminate HCl and excess HF. The acidity was about 7.7 N.

EXAMPLE 2

8 grams of iron powder was added to the solution of Example 1 and heated, another 100 ml of water was added. The solution was filtered and recovered 9.2 g of residue. The filtrate had an acidity of 1.75 N and contained 55.8 g/l $Fe^{+2}$, no $Fe^{+3}$, 85.6 g/l Ti.

Sufficient water was added to the filtrate so that the solution was 200 ml. To this solution, 18.8 g of $PbO_2$ was added so that the solution would contain 80 g/l Pb if the $PbO_2$ was totally soluble. The solution was filtered to recover 9.0 g of residue. The filtrate had an acidity of 1.3 N and contained 12 g/l $Fe^{+2}$, 25 g/l $Fe^{+3}$ and 48.5 Pb.

EXAMPLE 3

A lead concentrate containing 76.8% by weight lead, 3.4% by weight iron, 1.98% by weight zinc and having a moisture content of 7.5% was added to the leach solution of Example 2 under the following conditions:

| Leach vol. (ml) | Pb conc. (gram) | Pb/Fe$^{+3}$ | Temp (° C.) | Time (hr) |
|---|---|---|---|---|
| 200 | 13 | 1 | 70 | 3 |

The leachate was filtered and the following was found:

| Filtrate vol. (ml) | Fe total (g/l) | $Fe^{+2}$ (g/l) | $Fe^{+3}$ (g/l) | Pb (g/l) | Residue (gram) |
|---|---|---|---|---|---|
| 214 | 36 | 30.2 | 5.8 | 82 | 3.95 |

EXAMPLE 4

A portion of the filtrate of Example 3 was feed to an electrowinning step. A U-shaped electrowinning cell with a fritted disc in the middle (functioning as a membrane) was made. The anolyte and catholyte comprised 50 ml of the filtrate of Example 3. The current density was 250 A/m², the cathode area was 8 cm². The total electrowinning time was one hour and 40 minutes in which 40 minutes was for ferric reduction.

The results were: total current 0.2 A at 9 volts; 0.36 gram of Pb deposit, which represents a cathode efficiency of about 46.7%.

While there have been described what are presently believed to be the preferred embodiments of the invention, those skilled in the art will realize that changes and modifications may be made thereto without departing from the spirit of the invention. It is intended to claim all such changes and modifications that fall within the true scope of the invention.

What is claimed is:

1. A hydrometallurgical process for processing lead comprising:
   a. leaching a source of lead with a leach solution to form a leachate containing ferrous fluro compounds and lead fluro compounds wherein the leach solution contains fluotitanate, and not more than 50% fluoborate by weight of the leach solution;
   b. feeding the leachate to an electrolytic cell in which lead is deposited in pure form at the cathode and ferrous ions are oxidized to ferric ions at the anode.

2. The process of claim 1 wherein the leachate is filtered before feeding to the electrolytic cell.

3. The process of claim 1 further comprising the step of recycling the ferric ions of step (b) to step (a).

4. The process of claim 1 wherein the source of lead is galena.

5. The process of claim 1 wherein the source of lead is lead bullion.

6. The process of claim 1 wherein the acidity of the leach solution is from about 50 g/l to about 150 g/l.

7. A hydrometallurgical process for processing lead comprising:
   a. leaching a source of lead with a leach solution to form a leachate containing ferrous fluro compounds and lead fluro compounds wherein the leach solution contains fluotitanate and not more than 50% fluoborate by weight of the leach solution;
   b. subjecting the leachate to electrowinning to form metallic lead.

8. The process of claim 7 wherein the leachate is filtered before subjecting the leachate to electrowinning.

9. The process of claim 7 wherein during electrowinning ferrous ions are oxidized to ferric ions.

10. The process of claim 9 further comprising the step of recycling the ferric ions to step (a).

11. A hydrometallurgical process for processing lead comprising:
    a. leaching a source of lead with a leach solution containing fluotitanate to form a leachate containing ferrous fluotitanate and lead fluotitanate;
    b. subjecting the leachate to electrowinning to form metallic lead.

12. The process of claim 11 wherein the leachate is filtered before feeding to the electrolytic cell.

13. The process of claim 11 further comprising the step of recycling the solution of ferric fluotitanate of step (b) to step (a).

14. The process of claim 11 wherein the leach solution further includes fluotitanic acid.

15. The process of claim 11 wherein the leach solution includes fluotitanate compounds.

16. The process of claim 11 wherein the leach solution includes ferric fluotitanate.

17. A process for electrorefining of lead from a lead source comprising:
    a. providing an electrolyte containing a fluotitanate compound in an electrolytic cell;
    b. providing an anode comprising a lead source in the electrolytic cell;
    c. providing a cathode in the electrolytic cell wherein the anode and cathode are connected to a direct electrical current source; and
    d. allowing electrolysis to proceed to deposit refined lead on the cathode.

18. The process of claim 17 wherein the lead source is lead bullion.

19. The process of claim 18 wherein the electrolyte includes lead fluotitanate.

20. The process of claim 19 wherein the electrolyte includes fluotitanic acid.

21. The process of claim 1, wherein the leach solution includes fluotitanic acid.

22. The process of claim 7, wherein the leach solution includes fluotitanic acid.

* * * * *